(12) United States Patent
Jimenez (10) Patent No.: US 10,897,875 B2
(45) Date of Patent: Jan. 26, 2021

(54) BAG-HOLDING DEVICE

(71) Applicant: Roberto Jimenez, Union, NJ (US)

(72) Inventor: Roberto Jimenez, Union, NJ (US)

( * ) Notice: Subject to any disclaimer, the term of this patent is extended or adjusted under 35 U.S.C. 154(b) by 0 days.

(21) Appl. No.: 16/416,206

(22) Filed: May 18, 2019

(65) Prior Publication Data
US 2020/0359601 A1 Nov. 19, 2020

(51) Int. Cl.
*A01K 29/00* (2006.01)
*A01K 23/00* (2006.01)
*E01H 1/12* (2006.01)

(52) U.S. Cl.
CPC .......... *A01K 23/005* (2013.01); *E01H 1/1206* (2013.01); *E01H 2001/128* (2013.01)

(58) Field of Classification Search
CPC .............. A01K 23/005; E01H 1/1206; E01H 2001/122; E01H 2001/1226; E01H 2001/1246; E01H 2001/128; E01H 2001/1293
USPC ......................................................... 294/1.5
See application file for complete search history.

(56) References Cited

U.S. PATENT DOCUMENTS

| | | | | |
|---|---|---|---|---|
| 1,133,927 A | * | 3/1915 | Buzard ................. | A01D 46/247 56/337 |
| 4,360,229 A | * | 11/1982 | Kinney ................. | E01H 1/1206 294/1.4 |
| 4,466,647 A | * | 8/1984 | Spevak ................. | A01K 23/005 294/1.5 |
| 5,269,575 A | * | 12/1993 | Parvaresh ............ | A01K 23/005 294/1.5 |
| 7,204,532 B2 | * | 4/2007 | Lefevre ................. | E01H 1/1206 294/1.5 |
| 7,431,361 B2 | * | 10/2008 | Pilas .................... | A01K 23/005 294/1.5 |
| 8,109,547 B1 | * | 2/2012 | Miller ................... | A01K 23/005 294/1.4 |
| 8,684,429 B1 | * | 4/2014 | Holub ................... | E01H 1/1206 294/1.4 |
| 2008/0098959 A1 | * | 5/2008 | Iarrusso ............... | A01K 23/005 119/161 |

* cited by examiner

Primary Examiner — Dean J Kramer (57) ABSTRACT

A poop catching system and methods configured to removably hold a bag using at least one bag constrain; an extendable element configured to produce at least two position in the bag: opened and closed; such that in the opened position poop can enter into the bag and in the closed stop poop from exiting the bag; and a handle to allow the bag in the open position to be held underneath an animal while it is evacuating. Further aspects include that that the extendable element is a sliding plate and the poop catching system further comprises a fixed plate with mating geometry and in the closed position the sliding plate and fixed plate are flush to one another. Still a further aspect involves the at least one bag constraint configured being a gate type bag constraint.

17 Claims, 10 Drawing Sheets

BAG-HOLDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to a bag holding devices for the purpose of capturing objects in the bag and containing that object within the bag and in particular domestic related to capturing animal droppings.

BACKGROUND

Next to the wheel, a bag for carrying objects is one the most useful things ever invented by man. Bags come in various sizes and configurations. However, in spite of their long history, there are some deficiencies with bags that have yet to be overcome, specifically when you are referring to capturing animal dropping, particularly dog poop. This is especially true since many municipalities require pet owners to "scoop their poop" and take it with them.

The most common technique is to invert a bag over the top of your hand and then, with the bag acting a sort of mitten, grab the poop. After grabbing the poop then you raise the bag up and un-invert the bag with your other hand and then using both hands to twist the bag closed. This is by no means, a pleasant task.

Therefore, there continues to be a need for an efficient way of getting poop into the bag and then closing the bag, without requiring the person to bend over.

SUMMARY

In order to overcome the deficiencies in the prior art, systems and methods are described herein.

One aspect of the claimed invention involves a poop catching system configured to removably hold a bag using at least one bag constrain; an extendable element configured to produce at least two position in the bag: opened and closed; such that in the opened position poop can enter into the bag and in the closed stop poop from exiting the bag; and a handle to allow the bag in the open position to be held underneath an animal while it is evacuating.

A further aspect being that the extendable element is a sliding plate and the poop catching system further comprises a fixed plate with mating geometry and in the closed position the sliding plate and fixed plate are flush to one another.

Still a further aspect involves the at least one bag constraint configured being a gate type bag constraint.

These and other aspects described herein present in the claims result in features and/or can provide advantages over current technology.

A second aspect a method of placing a bag onto a poop catching system wherein the system comprises: an extendable element configured to produce at least three position in the bag being removably held: opened, closed and partially closed; wherein the extendable element is a sliding plate and the poop catching system further comprises a fixed plate, wherein the system further comprises at least one gate type bag constraint configured to work in conjunction with each of the sliding and fixed plates; wherein each gate type bag constraint has at least an insertion position and locked position; wherein in the insertion position the gate type bag constraint is configured to allow a portion of the bag to be pushed between the gate type bag constraint and the plate that it is working in conjunction with and in the locking position is configured to restrain the bag by capturing the portion of the bag pushed between the gate type bag constraint and the plate that it is working in conjunction with; and the method comprises: placing both gate type bag constraint into the insertion positions; moving the sliding plate into the partially closed position; inserting a bag into the poop catching system and folding the top of the bag over both of the gate type bag constraints; extending the sliding plate into the open position; pushing a portion of the bag to between each gate type bag constraint and the plate that it is working in conjunction with; and capturing the portion of the bag by placing each gate type bag constraint in their respective locking positions.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DETAILED DESCRIPTION

The instant devices and approach (system) provide a way for securing a bag for the purpose of capturing items, such as dog or other animal poop, into the bag and then closing the bag, without requiring the person to bend over.

The system is configured to removably hold a bag, wherein the bag may be a specially designed bag; a bag that you recycled, such as when you purchase an item from a store; and even larger bags, such as a garbage bag, can be accommodated. The system is configured to have an extendable element that is configured produce at least two positions in the bag: opened and closed.

Additionally, the system comprises a handle to allow the bag to be held underneath an animal (or otherwise in close proximity to the ground) while the animal is evacuating, such that the poop falls into the bag, while the bag is in opened position, and then the bag is subsequently closed. Having described the system in general, exemplary systems will now be presented beginning with FIG. 1A-B FIG. 1A-B show, in simplified form, a bag-holding device 10 without and with a bag 15 in the process of being loaded.

Figure 1A:
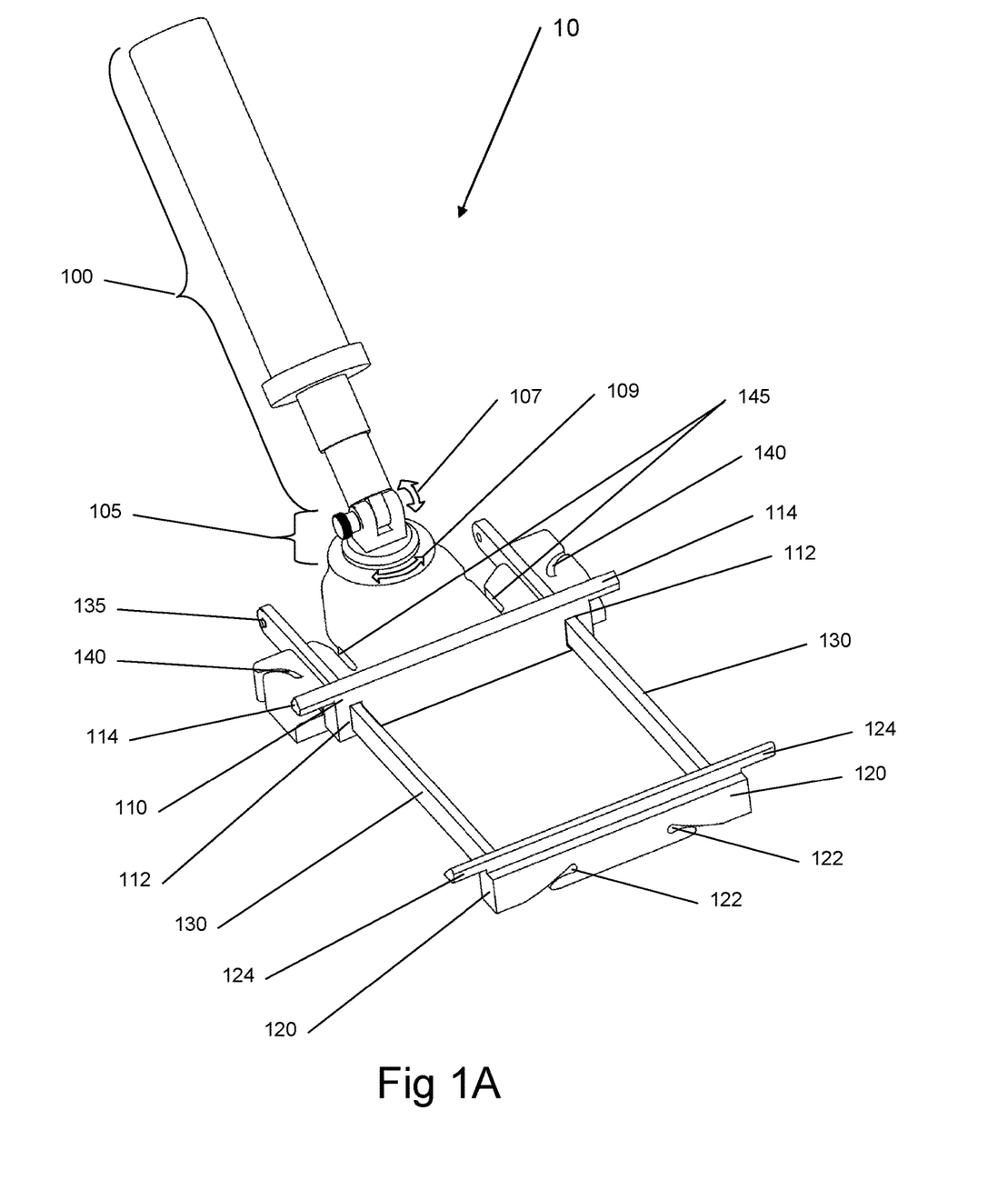
FIG. 1A-B show, in simplified form, a bag-holding device without and with a bag in the process of being loaded.
Figure 1B:
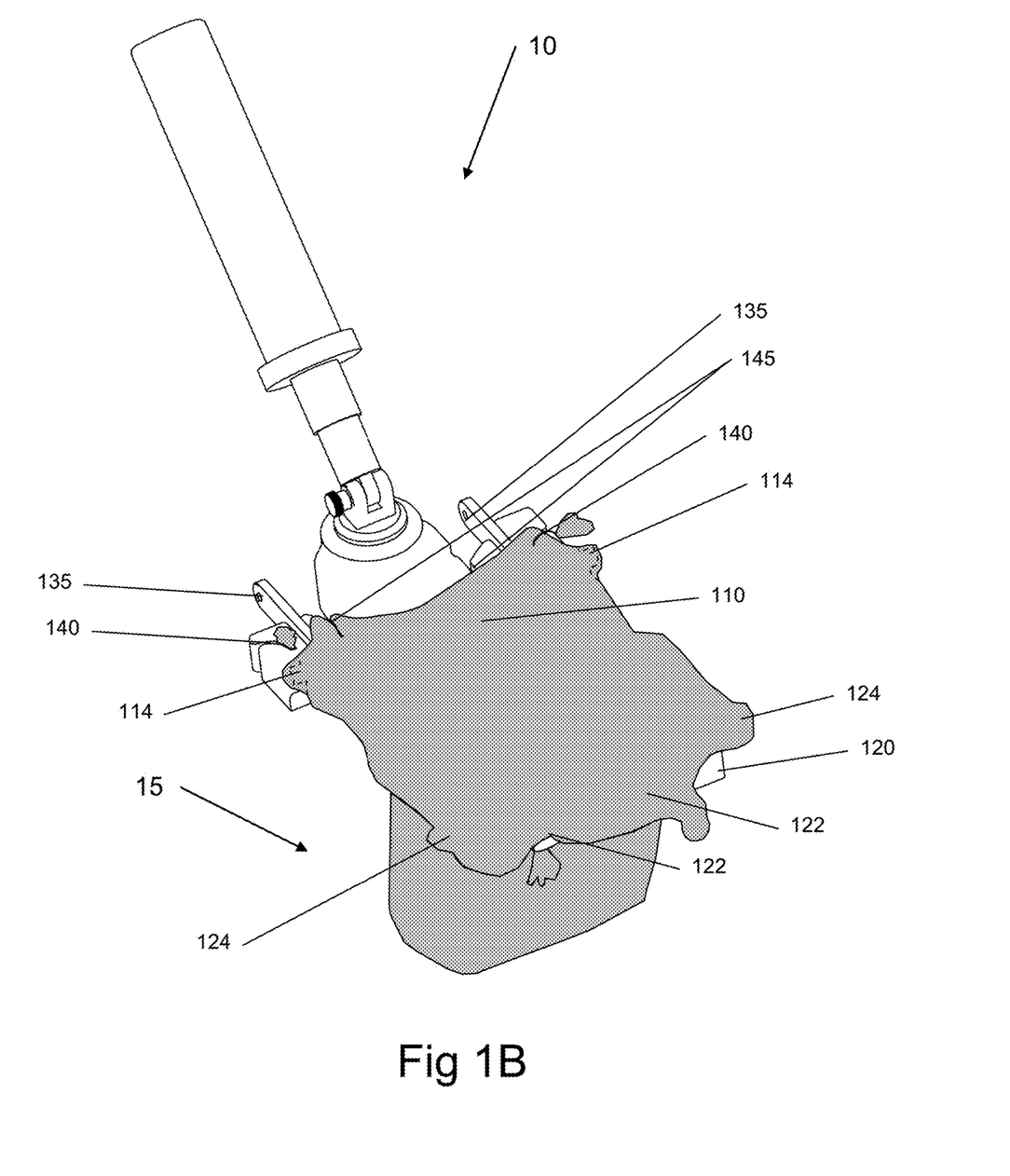

In FIG. 1A we see the bag-holding device 10 comprising a handle 100 and a handle attachment mechanism 105. The handle 100 is represented as a telescoping handle with adjustable length, but a fixed length is also anticipated.

The attachment mechanism 105 is represented as having two degrees rotation: vertical plane rotation 107 and horizontal plane rotation, which experience has determined are the two most useful forms of rotation for capturing animal droppings. However, three degrees of rotational freedom, such as with a ball and socket joint, and even one degree or fixed attachment are also anticipated. For instance, a very short fixed handle (see FIG. 4) with fixed attachment, with a porous bag, might be ideal for capturing fish within a fish tank. The importance being not the particular configuration of the handle and its attachment but that in combination that they allow the bag to be moved by hand into an appropriate position for capturing objects, without the need to bend over.

The bag-holder 10 is shown as having two plates: a fixed plate 110 and a sliding plate 120 (an extendable element). The sliding plate 120 is configured to move towards an away from the fixed plate 110 by the action of glides 130 represented as being able to travel through the glide slots 112 of the fixed plate 110.

It is worth noting that while the glides 130 are represented as bar stock, (with a corresponding modification to the glide slots 112) rods and other configurations such as I-beam can be utilized, with the latter being especially useful for larger units. The importance not being the particular type of glide and glide slot utilized but that they are configured to work in combination to allow the sliding plate 120 to move towards an away from the fixed plate 110. Additionally, in in FIG. 1A, it can be observed that glide stops 135 have been added to prevent the glides 130 to be fully pulled out of the bag-holder 10.

It should be further noted that the fixed plate 110 and the sliding plate 120 are represented as flat plates. As such, when the sliding plate is fully closed (touching the fixed plate), the two plates close flush against one another, whereby by closing flush against one another are configured to prevent odors for escaping from the bag. The importance being not that the two plates are flat (for instance they could have had a curved or saw-tooth geometry) but that they have mating geometry such that they can close flush against one another.

At the end of each plate are optional fingers 114, 124 and their purpose will explained shortly.

In FIG. 1A, associated with (work in conjunction with) each plate is at least one bag constraint 122, 140. [Note: while it is feasible to restrain the bag with a single bag constraint, especially when used with the optional fingers 114,124, we have observed that during movement of the sliding plate 120 towards the fixed plate 110, the bag 15 (see FIG. 1B) is more likely to disengage. However, with at least at least one bag constraint 122, 140 associated with each plate 110, 120, the bag 15, is more likely to remain engaged.] An alternative (or additional) location to the bottom of the plate 120 for the at least one bag constraints associated with each plate 110, 120 is on the side of the plate, just under the optional fingers 114, 124. The important being not the location but that it is configured to constrain the movement of the bag.

Another optional feature is one or more excess material constraint 145.

Shifting our focus to FIG. 1B we can see a bag 15 is partially installed on to the bag-holder 10. The bag 15 has been placed interiorly between the fixed plate 110 and the sliding plate 120. The opening for the bag 15 has been placed over the optional fingers 114,124, of each plate 110, 120.

With respect to the sliding plate 120, that material of the bag 15 has been gathered together and placed into the left side bag constraints 122 (where left and right are as represented in the image). The bag 15 is represented as wrapping under the optional finger 124, which was facilitated when the material of the bag 15 was placed into bag constraint 122.

On the right side of the image, the bag 15 has also been gathered together; however, it has yet to be installed into the right side bag constraint 122. As such, on the right side of the image, the wrapping has yet to occur. However, it is worth noting that had more of material of the bag 15 been gathered on the left side of the image then wrapping could have occurred on both sides, with a single bag constraint 122. As such, while one bag constraint 122 could be utilized, it has been observed that it is advantageous to have two or more, especially when accommodating bags of varying sizes, and particularly when the optional fingers 124 are used, where one or more bag constraints 122 associated with each optional finger 124.

With respect to the fixed plate 110, the bag 15 is represented on the right side of the image as wrapped around the optional finger 114 and slid into the bag constraint 140, from the top. However, on the left side of the image, the bag 15 is represented as having first been placed into the optional excess material constraint 145 on the left side and then into the bag constraint 140, from the bottom.

Similar to the conversation with regard to the sliding plate 120, it is helpful, especially when accommodating bags of varying sizes, and particularly when the optional fingers 114 are used, to have one or more bag constraints 140 associated with each optional finger 114.

It is also worth repeating, at this point, that a single bag constraint associated with just one of the plates 110, 120 is sufficient to hold the bag in place, especially when any slack in the bag is taken up by moving the sliding plate 120 away from the fixed plate 110.

We had previously mentioned one or more excess material constraints 145 (of which two are shown), which are utilized to gather/capture additional excess material from the bag 15 and thereby reduce the effective bag opening. For example, by gathering excess material into one or more excess material constraints 145 (in addition to using one or more bag constraints 140), the same bag-holder 10 could accommodate a bag that ranged in size from a bag for a loaf of bread (or smaller) to a bag the size of 50 gallon garbage bag (or bigger). It is worth noting that as shown, the bag constraints 114 can be used independent of or in combination with one or more excess material constraint 145.

The bag constraints 122, 140 (and the one or more excess material constraint 145) are represented as represented as passive notches, configured to secure bag material pulled into them. However, active bag constraints such as spring-loaded constraints, mechanical closures such as thumb-screws, and even tacky substances such as double-sided tape are also anticipated. The importance being not the configuration of the constraint but that it allows the bag to be secured to the bag-holder.

In the last paragraph, we mentioned mechanical closures such as thumbscrews. However, we would now like to draw your attention to a particular type of mechanical "gate" type closure, which is particularly advantageous and will be discussed in relationship to FIG. 2A-I.

FIG. 2A-I show, in simplified form, a bag-holding device 20 in perspective and side view without and with a bag 15 in the process of being loaded.

The bag-holder 20 of FIG. 2A-E is similar to the bag-holder 10 of FIG. 1A-B, except the at least one bag constraints 122, 140 of FIG. 1A-B have been replaced with at least one or more gate type bag constraints 210, 220 in FIG. 2A-E.

Figure 2A:
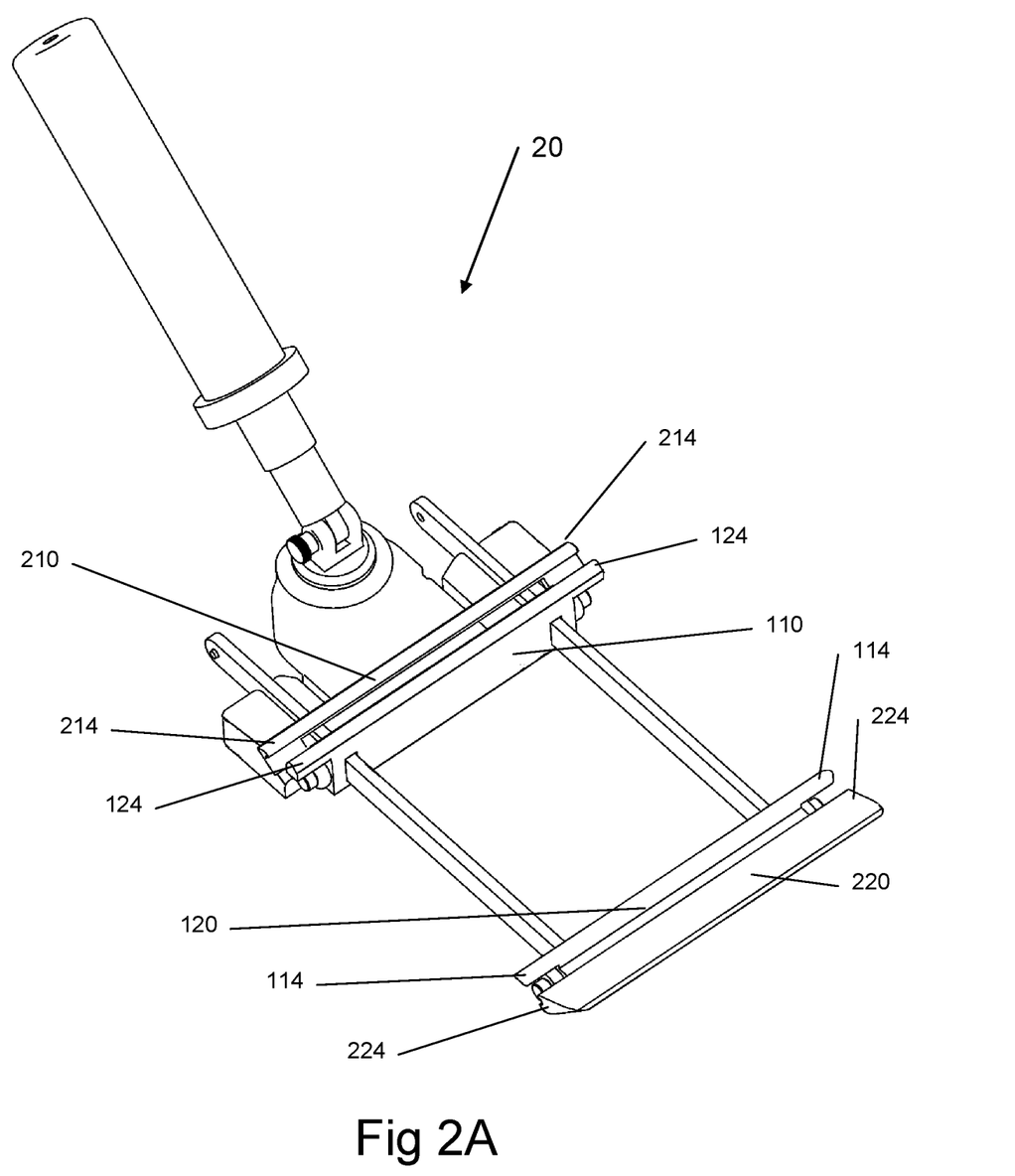
FIG. 2A-I show, in simplified form, a bag-holding device in perspective and side view without and with a bag in the process of being loaded.

With respect to FIG. 2A, the bag-holder 20 in an extended position, were the sliding plate 120 has been moved away from the fixed plate 110, and both gates 210, 220 are in the open position ready for insertion of a bag. The gates 210, 220 are represented as running the entire length of the plates 110, 120. However, partial and split gates are also anticipated. Specifically, the gates 210, 220 are shown to have extensions 214,224 that match the optional fingers 114, 124. The gate extensions 214,224 can be used with or without the optional fingers 114, 124 and serve a similar purpose to the optional fingers 114, 124 when used with the enhanced bag installation method, which will be detailed shortly. However, before we get to the enhanced bag installation method we want to explain additional aspects of this embodiment as well as the standard bag installation method.

[Note: similar to the previous conversation, only one gate type bag constraint 210, 220 is required. However, one gate type bag constraint 210 associated with the fixed plate 110 and a second gate type bag constraint 220 associated with the sliding plate 120 is particularly advantageous when the sliding plate 120 is moved towards the fixed plate 110. As such, this configuration will be the focus of subsequent discussion.

Figure 2B:
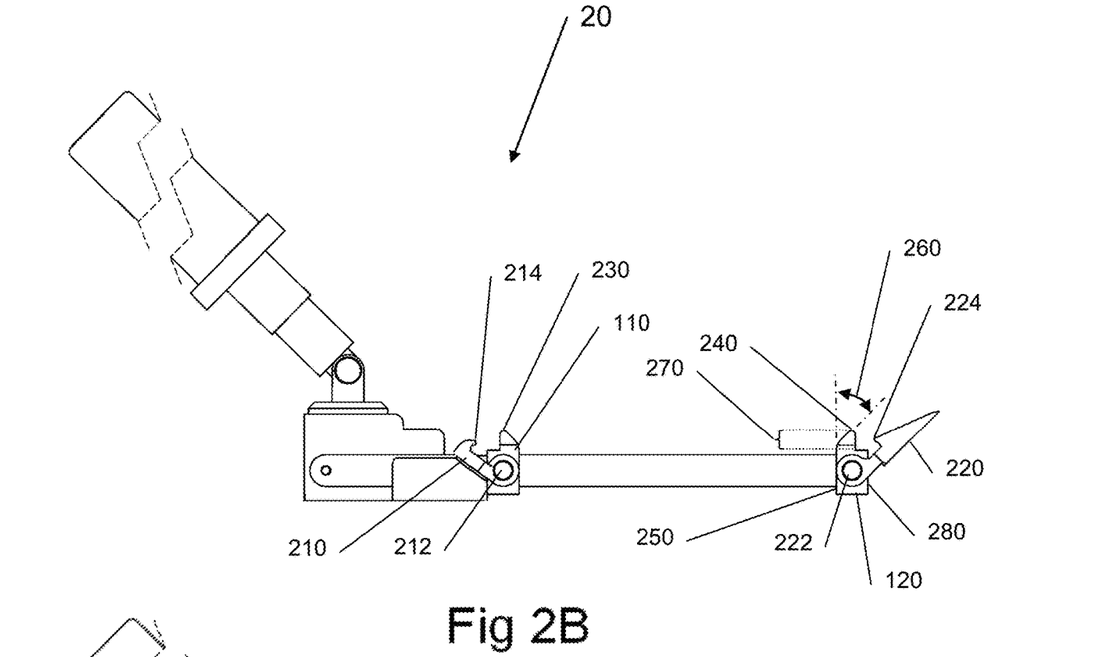

In FIG. 2B we see a side view of the bag-holder 20 where the sliding plate 120 has been moved away from the fixed plate 110 and the gates 210, 220 are in the open position ready for insertion of a bag. Both gates 210, 220 are represented as rotational gates and each having their own respective pivot points 212, 222, which allows them to swing into the locked position.

As there are two gates 210, 220, each plate is represented as having an edge 230, 240. For simplicity of manufacturing, the two edges 230, 240 and both plates 110, 120 are represented as mirror images of each other but that need not be the case. The importance being the interaction between the gates 210, 220 and the plates 110, 120 and not the particular configuration. For example, the edge 240 of the sliding plate 120 is represented as being formed by chamfering the inward face 250 of the sliding plate 120 (using a chamfer angle 260, typically 45 degrees) and the sliding plate 120 having a step-down 270 from the edge 240. This configuration allows the edge 240 to be central to the plate 120 rather than being associated with a plate face. Alternatively, the step-down 270 could have been eliminated and the chamfer could have run all the way to the outward face 280 of the sliding plate 120. Other options include reversing everything and creating the edge by chamfering the outward face 280, chamfering both faces 250, 280 or having only step-downs. Again, the importance being the interaction between the gates 210, 220 and the plates 110, 120 and not the particular configuration utilized.

Both gates 210, 220 have an overlap 214, 224, configured as a press fit with the appropriate edges 230, 240 and are used to snap/lock in place when closed. [Note that the edge could just have easily been associated with the gates and the overlap with the plates. The importance being that they snap/lock in place when closed.]

Figure 2C:
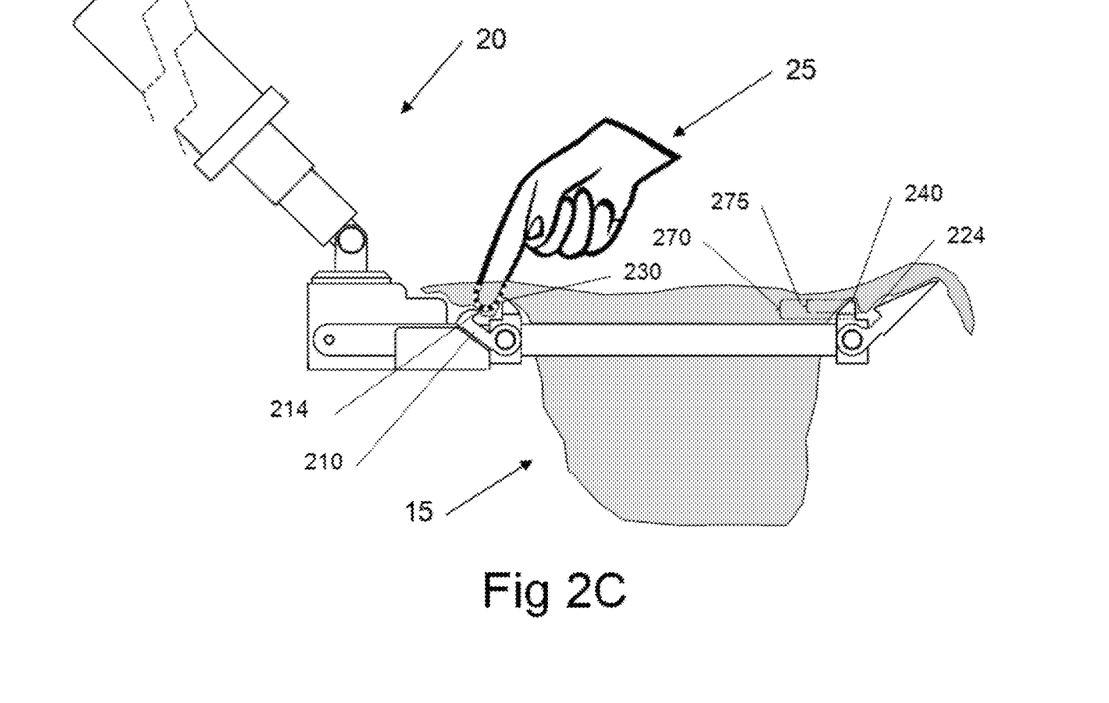
Figure 2D:
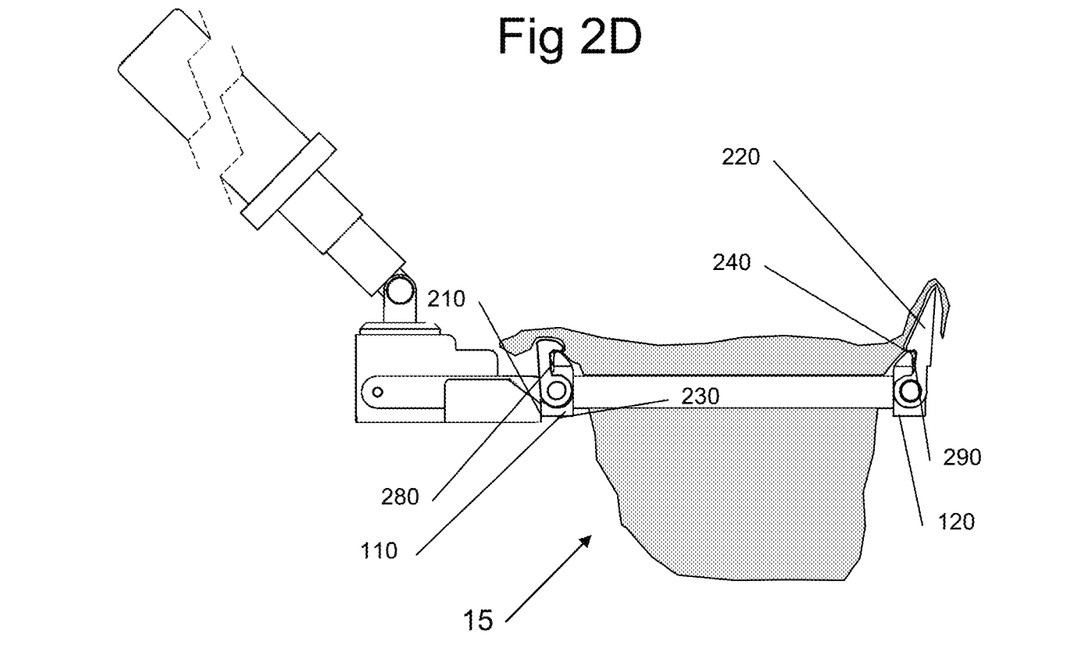

In FIG. 2C the bag 15 has been inserted into the bag-holder 20. A hand 25 of an operator is represented as using her finger to push the bag 15 below the level the edge 230 of the fixed plate 110, which would typically be done along the entire fixed plate 110. A similar operation represented as having already been performed along the sliding plate.

The purpose of pushing the bag 15 below the edges 230, 240 of each of the plates 110, 120 is so that when the gates are subsequently closed (see FIG. 2D), portions 280, 290 of the bag 15 will be captured between the gates 210, 220 and the edges 230, 240 of each of the plates 110, 120.

Returning to FIG. 2C, we see that there are two depths represented. One is the depth of the step-down 270 and the other is the depth that the bag has been pushed down below the edge 275. In practice, we have observed that in order for the bag to get captured along the length of the gate, the depth that the bag has been pushed below the edge 275 needs to be approximately 0.25 inches or greater. In order to get this depth, the step down should be slightly greater than the desired depth, e.g. around 0.333" or greater. (It should be noted that the "or greater" includes having no step-down at all as previously described). However, the relationship and the dimension specified are dependent on the thickness and rigidity of the bag and the thicker and stiffer the bag the more depth that you need.

The step-down is useful as a guide for the user to know that they have achieved the minimum depth; however, there is typically no harm in significantly exceeding the minimum depth, such as the case when there is no step-down, which is often desirable.

The shape of the two gates 210, 220 are representative of two of the many possibilities for gate design. The gate 210 associated with the fixed plate 110 has a flat top when it is locked in position. The gate 220 associated with the sliding plate incorporates a scoop/shovel design.

Incorporating a scoop is particularly advantageous as it allows the bag-holder to be used not just for catching objects when the fall into the bag but also for scooping. For example, by turning the bag-holder 20 from the horizontal position (as illustrated) to a vertical position (not shown) and placing the scoop portion of the gate 240 against the ground or other flat surface, items are easily brushed, raked, or swept into the bag 15. While separate scoops/shovels are also anticipated, the incorporation of the scoop into the gate 240 advantageously allows easy access to bag 15 placement during installation and then securing the bag 15 and moving the scoop into position all in one step.

Figure 2E:
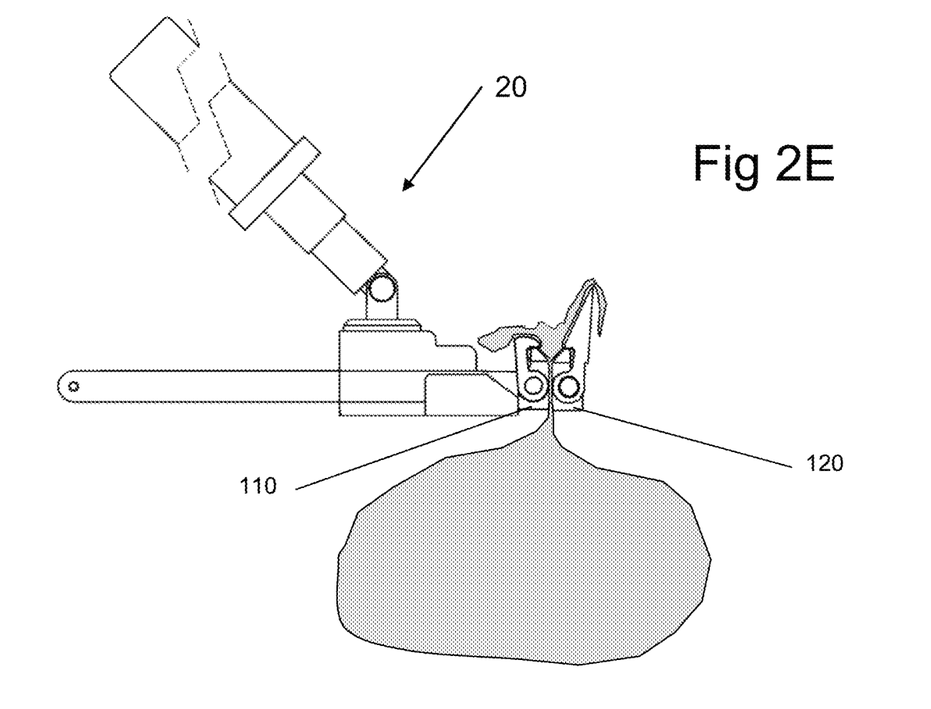

In FIG. 2E we see a representation where the sliding plate 120 has been brought all the way to the fixed plate and the bag 15 has been closed/sealed between the two plates 110, 120 and, as a result, any objects within the bag have been captured.

Having described the system in FIG. 2 A-E and of gated mechanical closures and the standard bag installation method, we will now turn our attention to the enhanced bag installation method with respect to FIG. 2F-I.

Figure 2F:
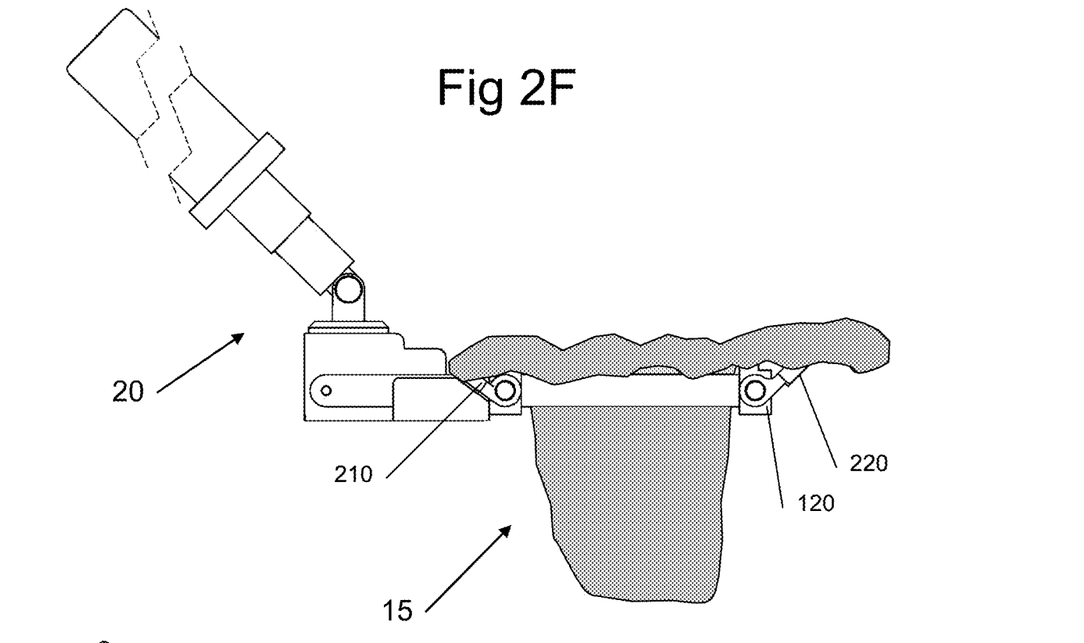

In FIG. 2F we see the bag 15 in the process of being loaded onto the bag-holding device 20. The sliding plate 120 has not been fully extended yet. The bag has been placed within the bag-holding device 20 and folded over both gates 210, 220.

Figure 2G:
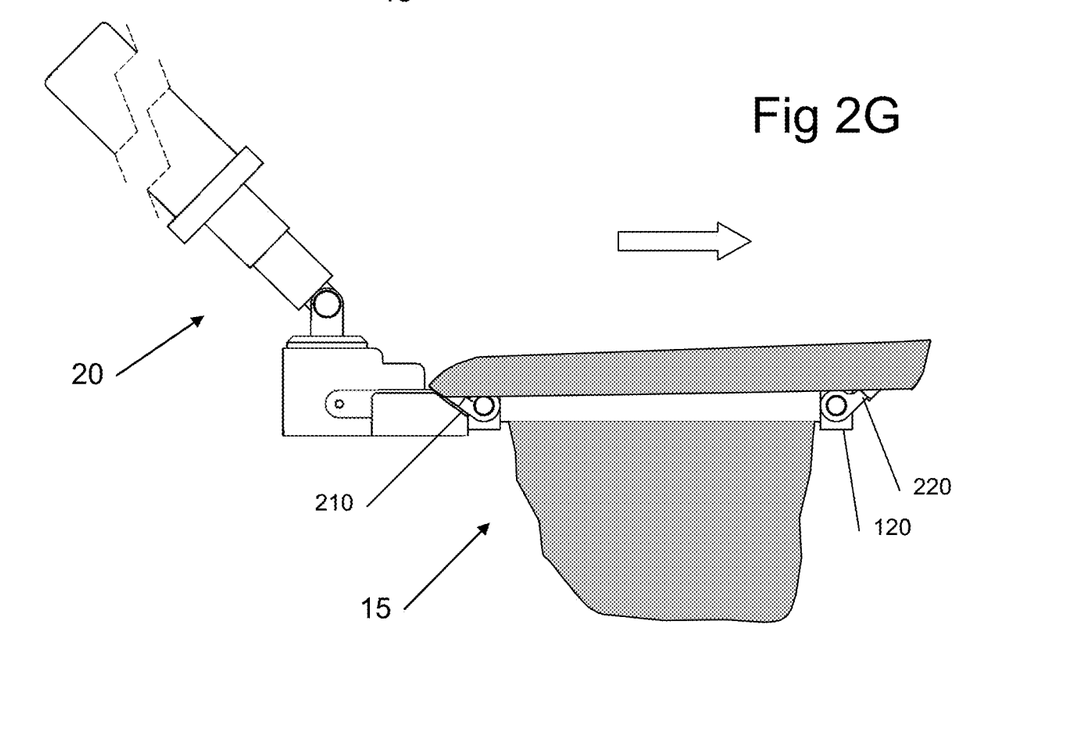

In FIG. 2G we see that the sliding plate 120 has been extended taking the slack out of the bag 15 with respect to region folded over both gates 210, 220. This procedure advantageously centers the opening of bag 15 between the gates and the region folded over both gates acts as a constraint/band limiting how far the bag 15 can be stretched, beyond which the bag will may be stretched beyond its plastic limit and ultimately destroyed.

Figure 2H:
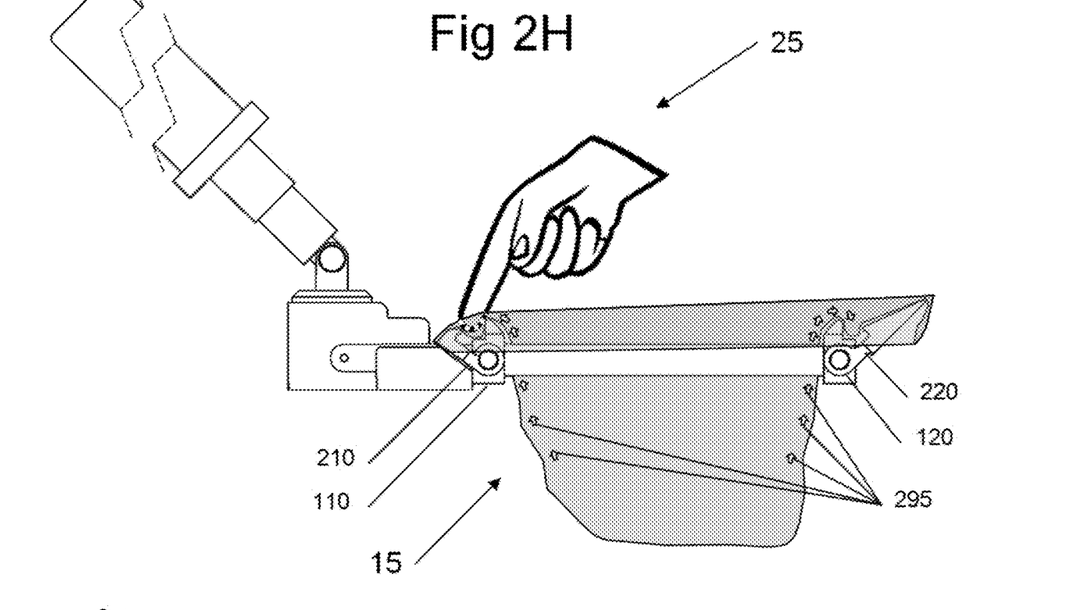
Figure 2I:
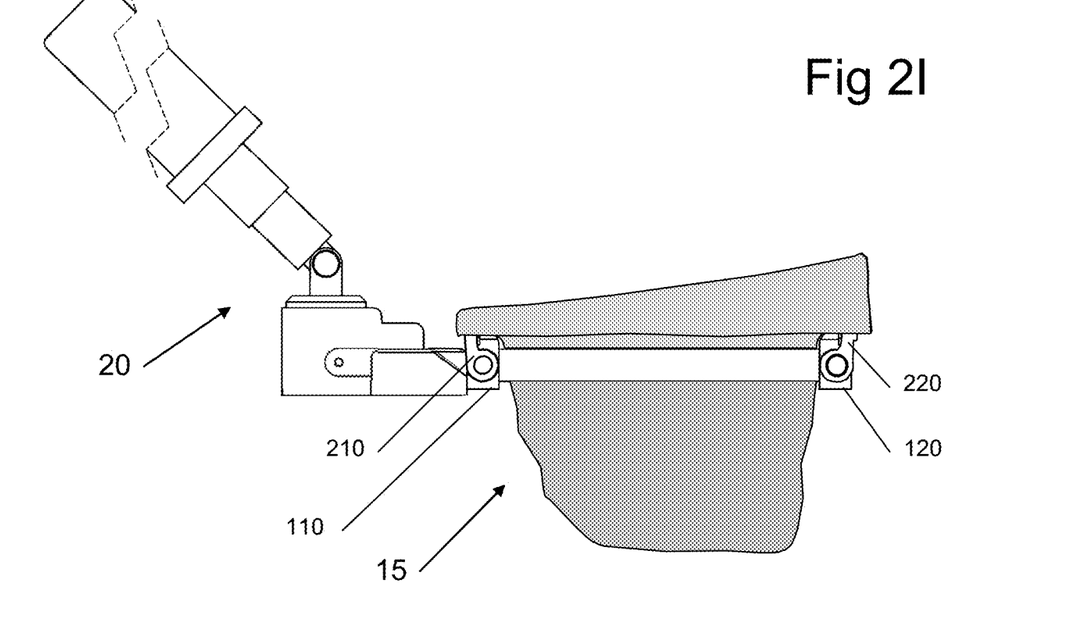

In FIG. 2H we see the hand 25 of an operator is represented as using her finger to push the bag 15 below between the fixed plate 110 and the gate 210 associated with the fixed plate 110. A similar operation represented as having already been performed between the sliding plate 120 and the gate 220 associated with the sliding plate 120. What is unique about this method of loading the bag 15 is that when the bag is pushed between the plates 110, 120 and the gates 210, 220 that the bag predominantly pulls up from the bottom as indicated by the arrows 295. As such, region folded over both gates 210, 220 continues to act as a constraint.

In FIG. 2H we see that both gates 210, 220 have been folded and snap/lock in place and the bag 15 has been captured between the plates 110, 120. With this enhanced bag installation method the region folded over both gates 210, 220 advantageously continues to act as constraint/band limiting how far the bag 15 can be stretched and at the same time it also serves the added purpose of ensuring that the bag-holding device 20 is kept clean during activities such as trying to catch poop.

[Note: Referring back to FIG. 2A, we had previously mentioned that the gate extensions 214, 224 can be used with or without the optional fingers 114, 124. With respect to the enhanced bag installation method we have observed that in practice it is better if the optional fingers 114, 124 are reduced such that they protrude less than the gate extensions 214, 224 or eliminated. With the optional fingers 114, 124 reduced or eliminated then, during the part of the loading procedure specified in FIG. 2G (the sliding plate 120 being extended and the slack being taken out of the bag 15 with respect to region folded over both gates 210, 220), the bag will naturally wrap around extending the gate extensions 214, 224, similar to the way the bag wrapped around the optional fingers 114, 124 as represented in FIG. 1B. If the optional finger 114, 124 are not reduced or eliminated then the bag 15 will still wrap around, but it will not wrap as tightly because it will be wrapping around both the gate extensions 214, 224 and the optional finger 114, 124.]

Having described the system and methods in FIG. 2 A-I, we would like to turn your attention to gated versions with an interlocking feature. However, before we do, we would like to present you some with some additional optional features as represented in FIG. 3A-C.

Figure 3A:
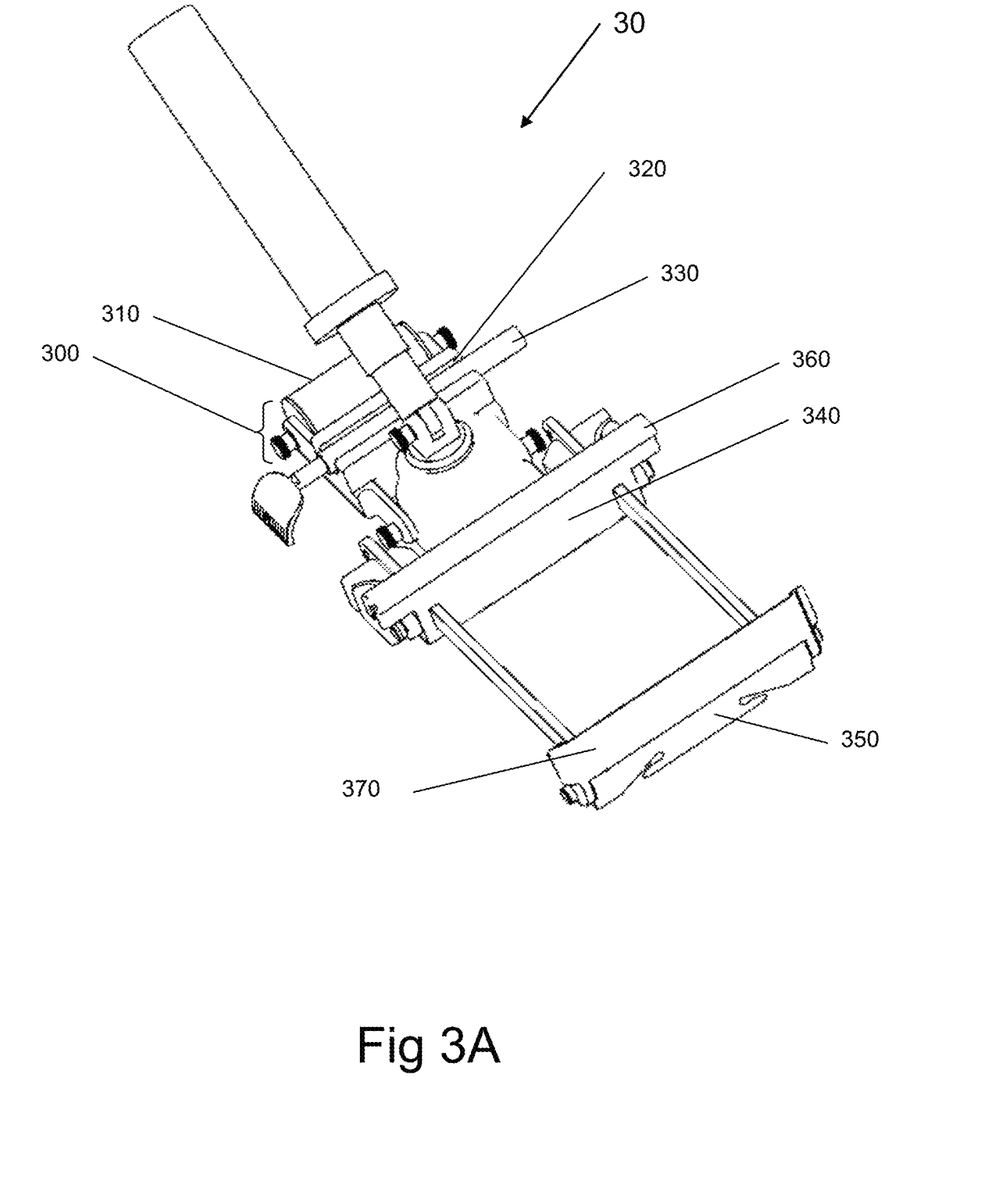
FIG. 3A-C shows, in simplified form, a bag-holding device in perspective and side view, with one or more optional attachments and an alternative gate version.
Figure 3B:
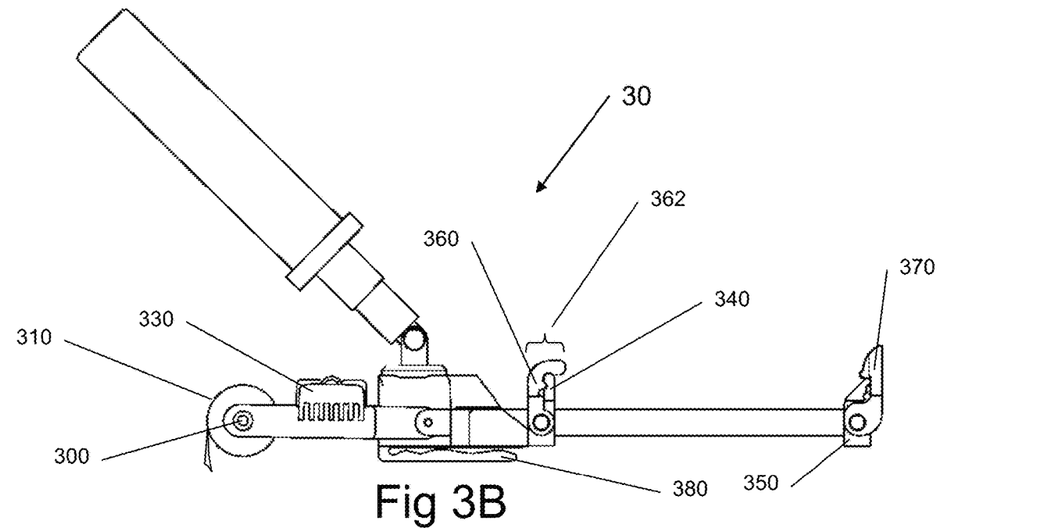
Figure 3C:
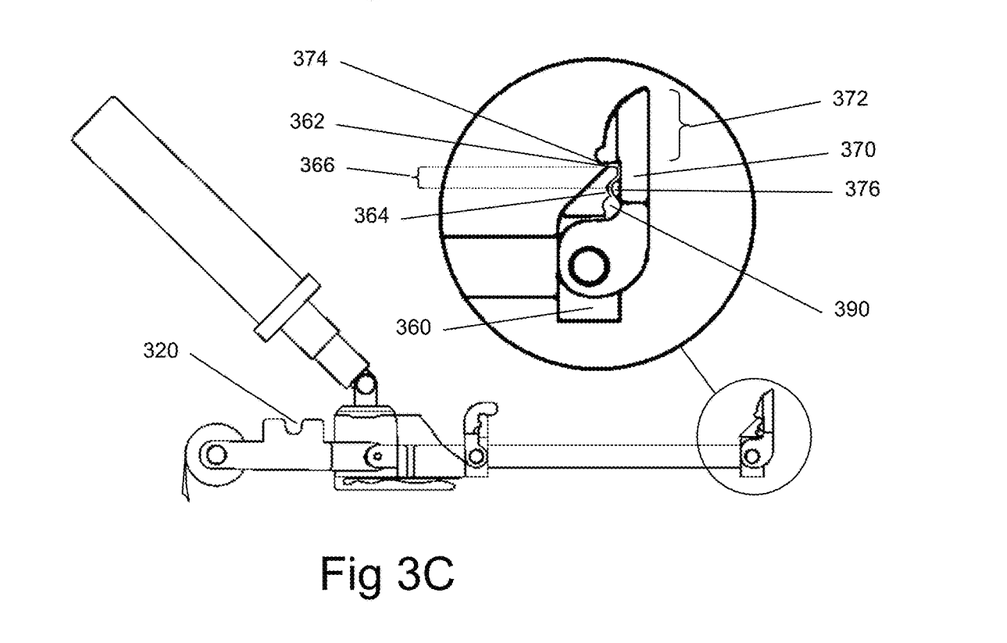

FIG. 3A-C shows, in simplified form, a bag holding 30 device in perspective and side view, with one or more optional attachments and an alternate gate version.

In FIG. 3A-C the bag-holder 30 is similar to the bag-holder of FIG. 2A-E, except that in FIG. 3A-C the bag-holder 30 includes one or more optional attachments: a bag dispenser 300, with a roll of bags 310; a tool holder 320, with and without a tool 330; a hanging attachment 380 (see FIG. 3B-C); and modified: fixed plate 340, sliding plate 350, and gates 360, 370.

The bag dispenser 300, which can be seen in FIG. 3A-C, is configured to hold a roll of bags 310 much the way a paper towel dispenser holds a roll of paper towels and extends from the back of the bag-holder, but other placement options, such as placing the roll of bags within the handle, are anticipated.

The tool holder 320 can be seen in FIG. 3A-B with a tool 330 and without in FIG. 3C. The tool is represented as a rake with an extendable handle but could have been other tools such as a shovel or knife. The tool holder 320 is represented as a press fit notch but could have been a through hole or a mechanical lock. The importance being not the particular configuration but that it is configured to hold a tool of interest.

Viewable in FIG. 3B-C is a hanging attachment 380, which is represented as a belt clip accessory but could also have been a wall hanging attachment.

Having described a few optional attachments, we would like to return to gate version with an interlocking feature, which can be seen best in FIG. 3B and especially FIG. 3C with its detail view.

The fixed plate 340 and sliding plate 350 each have gates 360, 370 associated with them. The gates 360, 370 noticeably differ in respect to their ends 362, 372. Specifically, the end 362 of the gate 360 associated with the fixed plate 340 is configured as a hook and the end 372 of the gate 370 associated with the sliding plate 350 is configured as a short scoop. However, one feature that both plates 340, 350 and associated gates 360, 370 are represented as having in common (though mirrored) is an interlocking feature configured to provide extra holding power. As the interlocking features are represented as mirrored, we will focus on describing the details of the interlocking features with respect to the detail view in FIG. 3C.

In FIG. 3C, in the detail view, we see that the sliding plate 360 has an edge 362 and inset interlocking feature 364, where the inset interlocking feature 364 is centrally located a distance 366 below the edge 362. The gate 370 has, in addition to the previously mentioned end 372, an overlap 374, and an offset interlocking feature 376. (Note: the general functions of the edge 362 and overlap 376 are as previously described.)

The offset interlocking feature 376 of the gate 370 is configured to mate with the inset interlocking feature 364 of the sliding plate 360 and, as such, is also centrally located a distance 366 below the edge 362 when the gate 370 is closed.

The inset interlocking feature 364 and the offset interlocking feature 376 are represented as a partial circular channel and a partial circular protrusion respectively; however, these could have just as easily have been reversed. Nor is the fact that they are partially circular a critical aspect. In some cases a triangular, which provides a second edge or rectangular, or rectangular, which provided two additional edges, can be highly desirable, especially when the bag-holder is being used to capture heavy objects. As such, the interlocking features, which may provide zero or more additional edges, are configured to provide additional holding power when engaged. Note: In practice we have found that the centrally located distance 366 below the edge 362 of approximately 0.25 inches or greater to be effective.

However, the ideally centrally located distance 366 is dependent on the thickness and rigidity of the bag that is desired to be held, with a thicker and stiffer the bag needing more distance. Additionally, the centrally located distance 366 is also dependent on the size of the mating interlocking features, with larger sized interlocking features needing more distance.

We would also like to point out that a useful additional feature is a gap 390 between the sliding plate 350 and the gate 370. Such a gap 390 can be result of an inset within the one or more of the sliding plate 350 or the gate 370 and is especially useful for gathering excess material associated with a bag such as a drawstring or zip-type closure mechanism.

Figure 4:
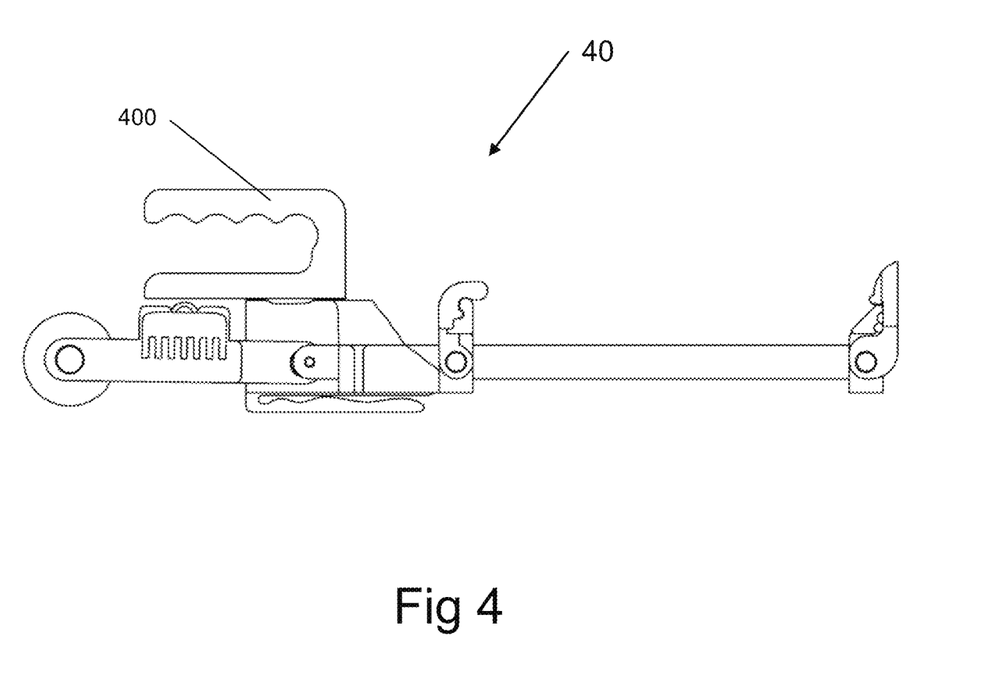
FIG. 4 shows, in simplified form a bag-holder with an alternative handle.

Finally, we would like to present to you an alternative handle arrangement, which can be seen in FIG. 4.

FIG. 4 shows, in simplified form a bag-holder 40 with an alternative handle 400. The bag-holder 40 is similar to the bag-holder 30 of FIG. 3A-C except that, rather than a long handle, a short alternative handle 400 is being utilized, which is advantageous for hand scooping.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed:

1. A poop catching system configured to removably hold a bag comprising:
    at least one bag constraint configured to restrain the bag to the poop catching system;
    an extendable element configured to produce at least two positions in the bag being removably held: opened and closed;
    wherein in the opened position the bag being held is configured to allow poop to enter into the bag and in the closed position to stop poop from exiting the bag;
    wherein the extendable element is a sliding plate and the poop catching system further comprises a fixed plate with mating geometry and in the closed position the sliding plate and fixed plate are flush to one another;
    at least one bag constraint configured to work in conjunction with each of the sliding and fixed plates;
    wherein the at least one bag constraint configured to work in conjunction with each of the fixed and sliding plates is a gate type bag constraint;
    wherein each gate type bag constraint has at least an insertion position and locked position;
    wherein in the insertion position the gate type bag constraint is configured to allow a portion of the bag to be pushed between the gate type bag constraint and the plate that it is working in conjunction with; and
    in the locked position is configured to restrain the bag by capturing the portion of the bag pushed between the gate type bag constraint and the plate that it is working in conjunction with; and
    a handle configured to allow the bag in the open position to be held underneath an animal while it is evacuating, such that the poop falls into the bag while the poop catching system is in the opened position.

2. The poop catching system of claim 1 wherein the gate type bag constraint configured to work in conjunction with the sliding plate further incorporates a shovel.

3. The poop catching system of claim 2 wherein moving the gate type bag constraint configured to work in conjunction with the sliding plate into the locking position is further configured to move the shovel into position to be used to scoop poop into the bag.

4. The poop catching system of claim 1 wherein fixed plate incorporates a step-down configured to limit the depth that the bag can be pushed between the gate type bag constraint and the fixed plate.

5. The poop catching system of claim 4 wherein the depth is 0.25 inches or greater.

6. The poop catching system of claim 1 wherein sliding plate incorporates a step-down configured to limit the depth that the bag can be pushed between the gate type bag constraint and the sliding plate.

7. The poop catching system of claim 6 wherein the depth is 0.25 inches or greater.

8. The poop catching system of claim 1 wherein fixed plate and gate type bag constraint that it is working in conjunction with further incorporate mating interlocking features configured to provide additional holding power by engaging the portion of the bag that has been pushed between the fixed plate and gate type bag constraint that it is working in conjunction.

9. The poop catching system of claim 8 wherein additional holding power is configured to engage the bag that has been pushed between the fixed plate and gate type bag constraint that it is working in conjunction at a depth of 0.25 inches or greater.

10. The poop catching system of claim 8 wherein additional holding power is configured to engage the bag that has been pushed between the sliding plate and gate type bag constraint that it is working in conjunction at a depth of 0.25 inches or greater.

11. The poop catching system of claim 1 wherein sliding plate and gate type bag constraint that it is working in conjunction with further incorporate mating interlocking features configured to provide additional holding power by engaging the portion of the bag that has been pushed between the sliding plate and gate type bag constraint that it is working in conjunction.

12. The poop catching system of claim 1 wherein the poop catching system is further configured to hold bags with varying sized opening based on the amount of extension undergone by the extendible element.

13. The poop catching system of claim 1 further comprising one or more excess material constraints and wherein the poop catching system is further configured to hold bags with varying sized opening by capturing excess material within the one or more excess material constraints, whereby the effective size of the bag opening is reduced.

14. The poop catching system of claim 1 wherein in the closed position it also configured to prevent odors for escaping from the bag.

15. The poop catching system of claim 1 wherein in the handle is one or more of telescoping or pivoting.

16. The poop catching system of claim 1 further incorporating one or more of a bag dispenser, a tool holder, and a hanging attachment.

17. A method of placing a bag onto a poop catching system wherein the system comprises:

an extendable element configured to produce at least three positions in the bag being removably held: opened, closed and partially closed; wherein in the opened position the bag being held is configured to allow poop to enter into the bag, in the closed position to stop poop from exiting the bag, and the partially closed position represents an intermediate position between opened and closed; wherein the extendable element is a sliding plate and the poop catching system further comprises a fixed plate with mating geometry and in the closed position the sliding plate and fixed plate are flush to one another;

at least one gate type bag constraint configured to work in conjunction with each of the sliding and fixed plates; wherein each gate type bag constraint has at least an insertion position and locked position; wherein in the insertion position the gate type bag constraint is configured to allow a portion of the bag to be pushed between the gate type bag constraint and the plate that it is working in conjunction with and in the locked position is configured to restrain the bag by capturing the portion of the bag pushed between the gate type bag constraint and the plate that it is working in conjunction with; and the method comprises:

placing both gate type bag constraint into the insertion positions;

moving the sliding plate into the partially closed position;

inserting a bag into the poop catching system and folding the top of the bag over both of the gate type bag constraints;

extending the sliding plate into the open position;

pushing a portion of the bag to between each gate type bag constraint and the plate that it is working in conjunction with; and capturing the portion of the bag by placing each gate type bag constraint in their respective locked positions.

* * * * *